US008417358B2

(12) United States Patent
Prummel

(10) Patent No.: US 8,417,358 B2
(45) Date of Patent: Apr. 9, 2013

(54) SYSTEM FOR BINDING CONTROLLER TO CONTROLLED SUBSTATIONS

(75) Inventor: Geert Prummel, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/513,282

(22) PCT Filed: Apr. 23, 2003

(86) PCT No.: PCT/IB03/01690

§ 371 (c)(1),
(2), (4) Date: Nov. 2, 2004

(87) PCT Pub. No.: WO03/094127

PCT Pub. Date: Nov. 13, 2003

(65) Prior Publication Data

US 2005/0198253 A1 Sep. 8, 2005

(30) Foreign Application Priority Data

May 6, 2002 (EP) .................................... 02076787

(51) Int. Cl.

| | |
|---|---|
| ***G05B 11/01*** | (2006.01) |
| ***G05B 15/00*** | (2006.01) |
| ***G05B 15/02*** | (2006.01) |
| ***G05B 23/02*** | (2006.01) |

(52) U.S. Cl. ................ 700/19; 700/11; 700/24; 700/25; 700/75; 340/3.5

(58) Field of Classification Search ................ 700/9, 11, 700/75, 25, 19, 24; 340/825.52, 825.69, 340/3.5
See application file for complete search history.

(56) References Cited

U.S. PATENT DOCUMENTS

| | | | | |
|---|---|---|---|---|
| 4,912,463 | A * | 3/1990 | Li | 340/825.69 |
| 5,291,193 | A * | 3/1994 | Isobe et al. | 340/825.69 |
| 5,453,738 | A * | 9/1995 | Zirkl et al. | 340/825.52 |
| 5,650,774 | A * | 7/1997 | Drori | 340/5.22 |
| 6,567,012 | B1 * | 5/2003 | Matsubara et al. | 340/825.72 |
| 7,057,512 | B2 * | 6/2006 | Stilp | 340/572.1 |
| 7,170,421 | B2 * | 1/2007 | Iseki | 340/825.69 |
| 7,173,513 | B2 * | 2/2007 | Laaser | 340/3.1 |
| 7,233,830 | B1 * | 6/2007 | Callaghan et al. | 700/9 |
| 7,292,157 | B2 * | 11/2007 | Sawada et al. | 340/825.22 |
| 7,345,593 | B2 * | 3/2008 | Park et al. | 340/825.72 |
| 7,403,827 | B2 * | 7/2008 | Itoh et al. | 700/65 |
| 7,415,310 | B2 * | 8/2008 | Bovee et al. | 700/9 |
| 2006/0092041 | A1 * | 5/2006 | Leman et al. | 340/825.72 |
| 2006/0142876 | A1 * | 6/2006 | Kalhoff et al. | 700/11 |
| 2006/0158343 | A1 * | 7/2006 | Lee et al. | 340/825.52 |
| 2006/0158344 | A1 * | 7/2006 | Bambini et al. | 340/825.69 |

(Continued)

FOREIGN PATENT DOCUMENTS

| | | | |
|---|---|---|---|
| EP | 0883098 | A2 * | 3/1998 |
| EP | 0867848 | A1 | 9/1998 |

(Continued)

*Primary Examiner* — Mohammad Ali
*Assistant Examiner* — Jennifer L Norton

(57) ABSTRACT

A control system includes control units for sending commands to system units to be controlled by the control units. Each system unit includes a table for storing the identification of at least one of the control units and a command. In a binding mode, the content of the table may be changed by a control unit.

10 Claims, 1 Drawing Sheet

U.S. PATENT DOCUMENTS

| | | | | |
|---|---|---|---|---|
| 2007/0018844 | A1 * | 1/2007 | Sutardja | 340/825.69 |
| 2007/0080823 | A1 * | 4/2007 | Fu et al. | 340/825.22 |
| 2008/0079602 | A1 * | 4/2008 | King et al. | 340/825.69 |
| 2008/0109889 | A1 * | 5/2008 | Bartels | 726/7 |
| 2008/0158003 | A1 * | 7/2008 | Linebarger et al. | 340/825.69 |
| 2008/0297372 | A1 * | 12/2008 | Wouters | 340/825.69 |
| 2008/0309513 | A1 * | 12/2008 | Ebbe et al. | 340/825.21 |

FOREIGN PATENT DOCUMENTS

| | | | |
|---|---|---|---|
| EP | 883098 | A2 * | 12/1998 |
| EP | 1058219 | A1 | 12/2000 |
| WO | WO 9006024 | A1 * | 5/1990 |
| WO | WO 9215977 | A1 * | 9/1992 |

* cited by examiner

SYSTEM FOR BINDING CONTROLLER TO CONTROLLED SUBSTATIONS

The invention relates to a system comprising control stations and substations controlled by said control stations, which stations comprise transfer means for communication between said stations via a transfer medium.

More in particular, the invention relates to a remote control system in which bindings are effected between the control stations and the substations controlled by said control stations, based on one on one, one on many or many on one, i.e. a binding between a control station and a substation, a control station and a number of substations or a number of control stations and one substation. The term binding is understood to mean a connection such that a controlled substation will only respond to control signals from the control station to which said substation is bound or connected.

An important field of application is the field of the remote control of appliances and apparatuses such as, in a special case, luminaries, sunblind units, heating equipment and the like in buildings. Hereinafter reference will be made to such a special application, without any limitation of the scope of the invention being intended by said reference.

In this special application, the control stations will form part of hand-held remote control units, and the controlled substations will form part of luminaries, for example, in which said substations in turn perform control functions of turning the lamps in the luminaries on/off, dimming said lamps etc. Hereinafter, the control stations will be called transmitters for easy reference, after all, said control stations are the transmitters of remote control signals, and the controlled substations will be called receivers, because said substations are the receivers of the remote control signals. The above, however, does not alter the fact that the controlled substations (the receivers), for reasons other than the mere transfer of remote control signals, may comprise transmission means for transferring different types of signals, and that the control stations (transmitters) may comprise receiving means for receiving said different types of signals, as will become apparent hereinafter.

The object of the invention is to provide a system of the type as described above, in which the bindings between the transmitters and the receivers can be effected in a flexible manner, i.e. in a manner which makes it readily possible to add or remove receivers at a subsequent point in time, i.e. to effect a new binding between a receiver and a transmitter to which said receiver was not bound before, or to remove an existing binding between a receiver and a transmitter. Subsequent addition/removal relates to the situation in which a system configuration has already been created through bindings between transmitters and receivers, which configuration must be altered at a subsequent point in time. It may be necessary in that case to effect new bindings or to remove existing bindings.

From EP 1 058 219 there is known as system of the kind referred to in the introduction, in which receivers make their identification codes known to a transmitter in response to a general call signal, and in which said identification codes are stored in the transmitter, functioning therein to effect bindings (after verification) between the transmitter and the receivers. It is not indicated in said document how a binding with a newly added receiver can be effected "subsequently", in the sense as described above, without affecting other receivers that are already bound, nor is it indicated how an existing binding can be removed. Said known system does not comprise a possibility of adding/removing receivers to/from an existing configuration of transmitters and receivers, therefore in a flexible manner, which possibility is required in practice.

In accordance with the object of the invention, a system comprising control stations and substations controlled by said control stations, which stations comprise transfer means for communication between the stations via a transfer medium, in which a control station comprises transmission means for transferring a control code signal and a substation comprises receiving means for receiving a control code signal, as well as execution means for processing said control code signal, is characterized in that each substation comprises table means for storing registrations in table form therein, each registration comprising at least an identification code of a control station and a control code, and table processing means for updating the table in a binding mode on the basis of a command received from a control station to enter a new registration or remove an existing registration, and verifying in a normal mode whether a received identification code and a control code are stored in the table, and if this is not the case, disabling the aforesaid execution means, in which the aforesaid transmission means are also arranged for transmitting, in combination with a control code signal, an identification code signal which identifies the control station, and in which means are present for placing the aforesaid table processing means in the binding mode.

In the table means, called table for the sake of brevity, of each substation it is thus recorded by means of a registration to which control station or control stations the substation has a so-termed binding, and consequently which control codes, i.e. the control codes from which control station or control stations will be processed by the execution means, that is, control codes will only be processed if the registration in the table indicates that a binding with said control station exists.

According to the system of the invention it is not only possible to bind a substation to a particular control station or a number of control stations, therefore, but also to a particular control code from said control station or control stations, which control code is related, for example, to a particular control key of the main station, so that a group of substations can be controlled therewith, for example, or different substations can be controlled with different keys.

The initial setting of the table upon installation of the system can be carried out in various ways, depending on the configuration of the system.

It is conceivable to provide each substation with a key to be operated by an operator, which key in turn operates a switch for placing the table processing means in the binding mode. In this simple case the system according to the invention as mentioned above already exhibits all the essential features of a practically feasible system. The signal transfer from a control station to the substation may take place via a wire connection, but also by means of a wireless connection, for example by means of infrared radiation or electromagnetic radiation.

In those cases in which it is problematic for practical reasons to provide a key, it is conceivable to use a selective call system, according to which system substations can be selectively called, which substations can then be selectively placed in the binding mode by means of a binding mode setting signal selectively transferred thereto. Selective call systems are generally known and require no further explanation. The system according to the invention can be used in combination with such a selective call system, in which the signals exchanged in the binding mode can be considered to be an additional signaling layer of the selective call system.

The signal transfer from a control station to a substation and the recording of registrations in the table in the substation can take place in a reliable manner if both stations are provided with means, which are known per se, for carrying out a known signal exchange procedure or protocol, also known as "handshake" procedure.

The identification of a substation whose identity is not known in advance can likewise take place in a manner which is known, for example from the aforesaid EP 1 058 219, by supplying a general call signal from a control station to the substations, which substations are arranged for responding thereto by transferring an identification code to the control station in question, which subsequently stores the identification codes that are received so as to be able to selectively call the substations on the basis thereof.

It should be noted, however, that the invention does not depend on the manner in which a substation is identified (which, as already mentioned above, may take place by means of a key on the substation), nor on the manner in which the communication between a control station and an identified substation is effected (via a wire connection, infrared or electromagnetic radiation), for the purpose of binding a substation to a control station.

The invention will now be explained in more detail on the basis of a practical remote control system for lighting in a building by means of luminaries, in which, as already mentioned before, the control stations are incorporated in hand-held remote control units provided with keys, and in which the substations form part of the luminaries, in which luminaries said substations in turn control lamp control units; for the sake of simplicity, the hand-held remote control units will be referred to as transmitters (of remote control signals) and the substations will be referred to as receivers (of remote control signals) in the description.

What will be discussed is a remote control system, with radio transmission taking place between the transmitters and the receivers, in which the identity of which receivers is not known in advance and in which bindings must be affected between the transmitters and the receivers after installation of the luminaries, with the whole of the bindings being called a configuration, which is to be formed upon installation and which may require alteration during operation. Consequently, the "transmitters" of such a system will comprise radio receiving means and the "receivers" will comprise radio transmission means for two-way communication. Said means, which are implicitly assumed to be present, are known per se. For the sake of a simple and purposeful description of the operation of the system according to the invention, the following conventions are established.

The system comprises transmitters A, B, C . . . , which each have an identification code or address, likewise referred to as A, B, C . . . . The transmitters comprise keys, which have been allocated key codes TCn (n is 1, 2 . . . ).

The system furthermore comprises receivers X, Y, Z . . . , which likewise each have an identification code or address, which is likewise referred to as X, Y, Z . . . .

BM indicates a code (signal) for placing a receiver in the binding mode.

NM indicates a code (signal) for placing a receiver in the normal mode.

ACK indicates a confirmation code (signal), which can be returned to a transmitter by a receiver.

D indicates a code (signal) for removing a binding.

Besides keys for normal remote control, a transmitter also has keys for placing a transmitter in the binding mode (also indicated BM), selectively calling receivers (indicated N (next) and P (preceding)) and removing a binding from a receiver (indicated D).

Communication between the stations takes place by means of messages/signals, which may be combinations of various codes, for example the message A+X+BM, which is a combination of a transmitter identification code A, a receiver identification code X and a code BM which indicates that the receiver must enter the binding mode.

It is implicitly assumed that in those cases in which messages/signals which can also be transferred in the normal remote control mode NM, such as A+TC1, are being transferred in the binding mode, said messages/signals have different codes so as not to cause any confusion.

Now a description will be given of the operation of the remote control system as regards the effecting of a configuration of bindings and alterations thereof.

An operator of a transmitter presses a key BM or two keys BM simultaneously, thus placing the transmitter, for example the transmitter A, in the binding mode (with a characteristic light signal possibly being delivered by a light-emitting diode (LED) on the transmitter).

Then a key N or P is pressed (which is disabled in the normal mode), causing the transmitter to transfer the message A+BM, as a result of which all the receivers that receive said message are placed in the binding mode (it will be explained hereinafter that in a preferred embodiment of the invention this will only be the case with receivers which are "free", i.e. which do not have any bindings yet or which are bound to the transmitter A).

A receiver (for example X) which receives the message A+BM (and which, in the preferred embodiment, is "free" or bound to the transmitter A), returns the message X, which message is received by the transmitter A and stored in, for example, a circulating memory together with messages Y, Z . . . being received from other receivers within the range of the transmitter A. (The LED on the transmitter A may deliver a characteristic light signal during the search for receivers, and a different signal when all the receivers have been found.) (A receiver which has received and processed the message A+BM can manifest itself, for example, by means of a light signal or by turning on the luminary.) The operator presses the key N (or P) in that case for selecting a receiver, as a result of which the transmitter transfers the message A+X, for example, if X is the first address that is ready in the circulating memory, which message is subsequently received and processed by the receiver X, which is confirmed by the message ACK from the receiver X to the transmitter A (the LED on the transmitter A will deliver a characteristic light signal upon receipt of ACK, whilst a different signal will be delivered if ACK is not received (within a predetermined period of time)).

If the message ACK has been received, the operator will press the key to which the receiver X will have to respond in the normal mode, and the transmitter A will transfer the message A+TC1, for example, if the receiver must respond to TC1. The receiver X responds to said message by storing the codes A and TC1 in table means according to the invention present in every receiver, with each combination of a transmitter code, such as A, and a key code, such as TC1, indicating a binding of the receiver (X in this case), not only to a particular transmitter (A in this case) but also to a particular key (TC1 in this case) of said particular transmitter. Furthermore, the receiver X confirms the receipt and processing of the message (A+TC1) by returning the message ACK. (The LED on the transmitter A may deliver a characteristic light signal again upon receipt of ACK.)

The operator may now elect, by pressing the key N or the key P, to bind a further receiver, whose address is now ready in the circulating memory, to the transmitter in the manner as already described with regard to the receiver X, according to which manner also the receiver Y, for example, is bound to the transmitter A, for example by means of the key TC2 in this case. Receivers which have been placed in the binding mode and which will not be further bound will return to the normal mode after some time, or otherwise, for example in response to a general message NM being transferred from the transmitter to all the receivers.

In this way a configuration has been effected between the receivers X and Y and the transmitter A/key code TC1 or the transmitter A/key code TC2.

The process as described above may be carried out with conventional means which are usually already present in such a system, such as radio receiving/transmitting means, signal processing means, means for controlling the LED, code storage means etc. The means that are more specific to the invention, such as the table means in the receiver and the table processing means (yet to be described) can also be realized by means which are known per se by a person skilled in the art on the basis of the directions with regard to the process that are provided herein.

Consequently, component parts are only represented by a few blocks in FIGS. 1 and 2, which show block diagrams of a transmitter and a receiver, respectively, and the means which are more specific to the invention are represented by blocks which will be described more specifically, although it will be understood that the functions performed by the blocks may be integrated in a single programmed microprocessing unit (microprocessor, microcontroller).

Figure 1:
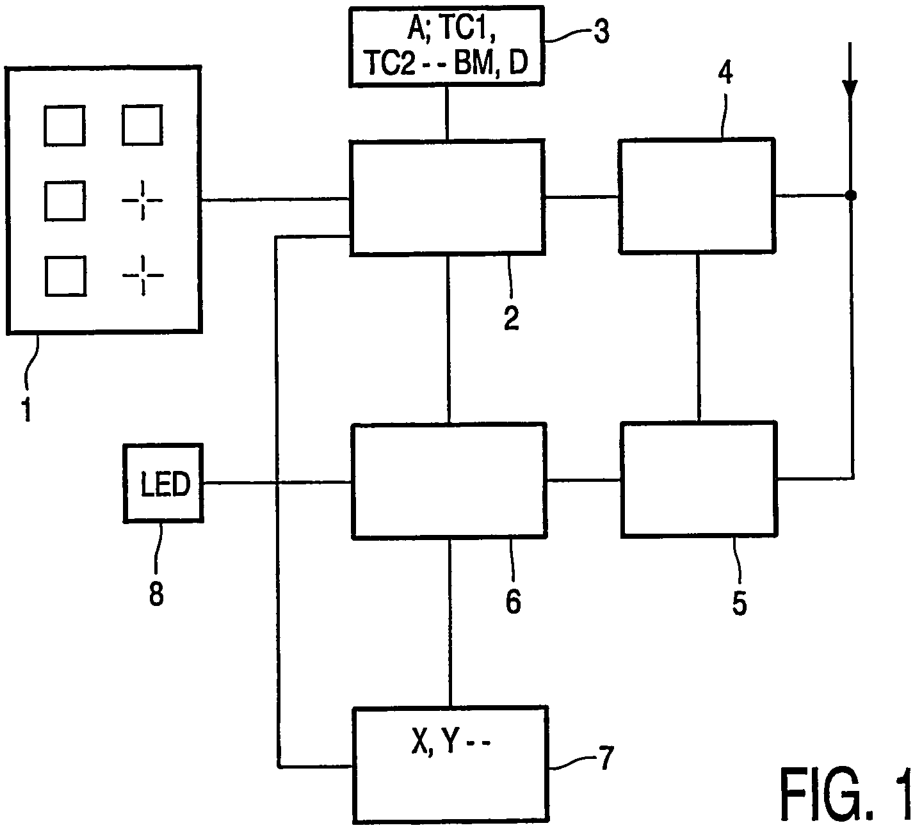
FIG. 1 is a block diagram view of a transmitter in accordance with embodiments of the present system.

The transmitter being represented in the block diagram of FIG. 1 comprises a keypad 1 consisting of a number of keys, a signal processing unit 2 with associated encoding means 3 for the various codes A, TC1 etc that are used, radio transmitting/receiving means 4, 5, a signal processing unit 6, identification code storage means 7, an LED indicator 8, and further usual means (not shown) for the power supply etc.

Figure 2:
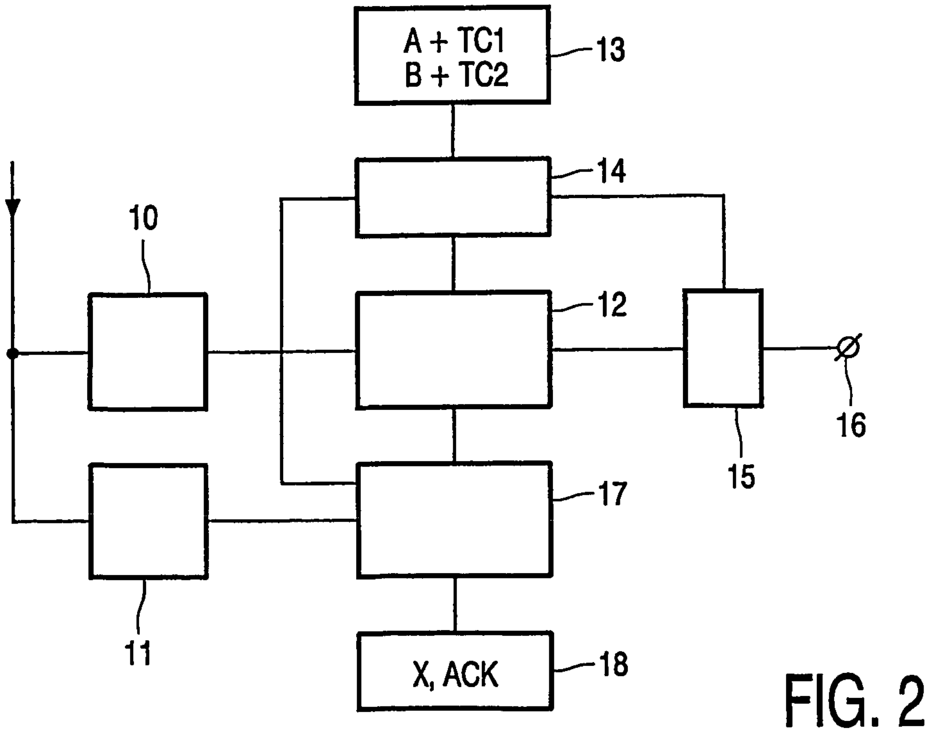
FIG. 2 is a block diagram view of a receiver in accordance with embodiments of the present system.

The receiver as shown in FIG. 2 comprises radio receiving/transmitting means 10, 11, a signal processing unit 12, table means 13, table processing means 14, control command execution means 15, a command output 16, and signal processing means 17 with associated encoding means 18. The table means 13 (FIG. 2) function to contain identification codes and key codes of the transmitter to which the receiver is bound.

In the normal mode, i.e. during normal operation of the remote control system, a receiver will verify by means of the table processing 14 upon receipt of a control message, for example A+TC1, whether this is message whose code is stored in the table means. If this is not the case, the table processing means 14 will disable the control command/execution means 15, as a result of which no further action will be taken in response to said message. If the control code, for example A+TC1 in this case, does occur in the table, said disabling will not take place, or the control command/execution means 15 will be enabled to supply the decoded control command to the command output 16, and from there to further control means of, for example, the luminary.

In a preferred embodiment of the system according to the invention the table processing means 14, in addition to performing the above-mentioned functions of entering codes into the table 13 in the binding mode, verifying the presence of codes in the table 13 in the normal mode, and disabling/enabling the execution means 15 in dependence thereon, also perform the function of preventing, in the normal mode, the receiver from transferring the identification code thereof to the transmitter after it has been determined that an identification code received from said transmitter does not correspond to a code stored in the table means.

This additional function of the table processing means can be used advantageously in the case that a configuration of transmitters and receivers must be altered after the initial installation of the lighting system.

The operation of the system will now be described in connection with the alteration of an existing configuration, in which the receivers X and Y are bound to the transmitter A, for example, and the receiver X must also be bound to the transmitter B, for example.

The operator of the transmitter A presses the key or keys BM in that case, and the same is done by the operator of the transmitter B, as a result of which both the transmitter A and the transmitter B are placed in the binding mode. The operator of the transmitter A then presses the key N or P, and the transmitter A subsequently transmits the message A+BM. Said message is in principle received by every receiver within the range of the transmitter A, but in the preferred embodiment of the invention only the table processing means 14 of the receivers that already have a binding to the transmitter A will establish that the code A of the message A+BM is present in the associated table 13. In the preferred embodiment, the table processing means 14 also function to prevent the receiver being placed in the binding mode if the receiver is bound to transmitters other than, in this example, the transmitter A. Consequently, said receiver will not return a message to the transmitter A.

The receiver X, which is bound to the transmitter A, returns the message X to the transmitter A, and corresponding messages may be received from other receivers that are bound to the transmitter A, and the identification codes thereof are stored in the code storage means 7. The operator can select the receiver a X in a manner as already described before by operating the keys N and P. Following that, the operator of the transmitter a B operates a key and sends the message B+TC2, for example if the key TC2 is being pressed. The receiver X receives the message B+TC2 and stores the codes in the table 13, by means of which the binding to the transmitter B/key TC2 has been effected. A similar procedure can be used for removing a binding. Using the same example as above, the operator can have the transmitter A send the message A+−D, after the transmitter A has selected the receiver X, by pressing a key D (disconnect), whereupon the table processing means 14 in the receiver X will erase the code A in the table 13.

From the foregoing it will be understood that the procedure of altering a configuration by adding or removing a binding will not affect other existing configurations in any way, because the table processing means of the preferred embodiments prevent receivers which only form part of said other configurations being placed in the binding mode. Only receivers, which form part of the configuration that is being altered, will respond, thus preventing existing configurations being interfered with.

The preferred embodiment of the invention is also very advantageous upon initial configuration following the installation of the lighting system, at which point no bindings exist yet. As soon as receivers are bound to a transmitter, for example the transmitter A, said receivers will no longer respond to messages from other transmitters attempting to place receivers in the binding mode. The number of receivers, which respond, will decrease in the course of the configuration procedure, therefore, as more receivers are being bound to transmitters, as a result of which the possible problem of distinguishing between the responses from the various receivers will automatically be alleviated in the course of the configuration procedure. This possible problem may be alleviated in a manner which is known, by having the receiver respond to a signal from a transmitter with different time delays that have been programmed for every individual receiver, resulting in a certain structuring as regards the response time of the receive. In the preferred embodiment according to the invention, the number of responses decreases as the binding procedure progresses, and the problem will automatically be alleviated.

It will be understood that the means for performing functions that have been discussed in the above may be implemented in various ways known to those skilled in the art, for example in hardware, software, hardware-implemented software, specific circuits and combinations thereof, and that the blocks that are shown in the figure are merely illustrative, and that the signal processing means of the transmitters and the receivers can be realized in an advantageous manner in the form of a suitably programmed microprocessing unit (microprocessor or microcontroller), which programming will not present a person skilled in this field of the art who has perused the above description of the functions with any special problems.

The invention claimed is:

1. A system comprising:

a station including a memory and a processor; and a controller configured to transmit to the station a controller identification code and a controller key code;

wherein, in a binding mode entered in response to a bind command from the controller, said processor is configured to:

save the controller identification code and the controller key code in the memory in a table form; and prevent the station from responding to messages from other controllers attempting to place the station in the binding mode, unless the controller also transmits the bind command to enter a new registration; and wherein, in a normal mode, said processor is configured to:

verify presence of the controller identification code and the controller key code in the memory;

disable the processor if the controller identification code and the controller key code are not present in the memory;

enable the processor if the controller identification code and the controller key code are present in the memory; and prevent the station from transferring a station identification code to the controller after determining that the controller identification code received from the controller does not correspond to a code stored in memory.

2. The system of claim 1, wherein the controller is further configured to transmit the bind command for placing stations within range in the binding mode.

3. The system of claim 2, wherein the stations that have been placed in the binding mode and which will not be further bound will return to the normal mode after a predetermined time.

4. The system of claim 1, wherein the controller key code is associated with a group of substations.

5. The system of claim 1, wherein another controller is bound to the station only after the station is placed in the binding mode by the controller which is already bound to the station.

6. The system of claim 1, wherein the controller further comprises a key configured to erase a portion of data stored in the memory of the station.

7. The system of claim 6, wherein the portion is the identification code.

8. A system comprising:

a station including a memory and a processor; and a first controller configured to transmit to the station a first bind command for placing the station in a binding mode, wherein the first bind command includes a first controller identification code and a first controller key code of the first controller and wherein, in the binding mode, said processor is configured to save the first controller identification code and the first controller key code in the memory;

wherein, when the station is already bound to the first controller, said processor is further configured to prevent the station from responding to a second bind command from a second controller attempting to place the station in the binding mode unless the first controller also transmits the first bind command, and wherein, in a normal mode, said processor is configured to:

verify presence in the memory of a second controller identification code and a second controller key code of the second controller;

disable the processor if the second controller identification code and the second controller key code are not present in the memory;

enable the processor if the second controller identification code and the second controller key code are present in the memory; and prevent the station from transferring a station identification code to the second controller after determining that the second controller identification code received from the second controller does not correspond to a code stored in memory.

9. The system of claim 8, wherein the station is configurable to be bound to the first control station and the second control station.

10. The system of claim 8, wherein the station and a group of stations are configurable to be bound to a control code so that the station and the group of stations are controlled by the first controller upon transmitting the control code.

* * * * *